United States Patent
Sanchez Galicia et al.

(10) Patent No.: US 9,891,091 B2
(45) Date of Patent: Feb. 13, 2018

(54) LEVEL MEASUREMENT METHOD AND APPARATUS

(75) Inventors: Edgar Ramon Sanchez Galicia, Cleveland (GB); Kenneth James, Cleveland (GB); Stephen John Roe, Cleveland (GB)

(73) Assignee: Johnson Matthey Public Limited Company, London, England (GB)

(*) Notice: Subject to any disclaimer, the term of this patent is extended or adjusted under 35 U.S.C. 154(b) by 941 days.

(21) Appl. No.: 14/130,378

(22) PCT Filed: Jun. 29, 2012

(86) PCT No.: PCT/GB2012/051530
§ 371 (c)(1),
(2), (4) Date: Jan. 23, 2014

(87) PCT Pub. No.: WO2013/005011
PCT Pub. Date: Jan. 10, 2013

(65) Prior Publication Data
US 2014/0136127 A1    May 15, 2014

(30) Foreign Application Priority Data
Jul. 1, 2011 (GB) .................................. 1111211.7

(51) Int. Cl.
*G01F 23/284* (2006.01)
*G01F 23/288* (2006.01)
(52) U.S. Cl.
CPC .......... *G01F 23/284* (2013.01); *G01F 23/288* (2013.01)
(58) Field of Classification Search
CPC .............................. G01F 23/288; G01F 23/284
(Continued)

(56) References Cited

U.S. PATENT DOCUMENTS 2,674,695 A * 4/1954 Grace, Jr. ............. G01F 23/288
250/357.1
2,765,410 A * 10/1956 Herzog ................. G01F 23/288
250/432 R
(Continued)

FOREIGN PATENT DOCUMENTS

CN          1186951 A      7/1998
WO     2010/032064 A1     3/2010

OTHER PUBLICATIONS

International Search Report, dated Oct. 10, 2012, from corresponding PCT application.
(Continued)

*Primary Examiner* — Leslie J Evanisko
(74) *Attorney, Agent, or Firm* — Baker & Hostetler LLP

(57) ABSTRACT

A method and apparatus for determining the location of a phase boundary such as a fill level, in a vessel. The method includes: providing at least one source of radiation capable of emitting radiation through a portion of the interior of the vessel; providing a plurality of radiation detectors, each detector being capable of detecting, within a part of the measurement range, radiation emitted by the source; and providing a data processing unit for calculation of the position of the phase boundary from the amount of radiation detected by the detectors, wherein the data processing unit calculates the position of the phase boundary from the amount of radiation detected by the detectors by:
(i) in a first step, determining within which detector stage the phase boundary is located; and then
(ii) in a second step, determining the position of the phase boundary within the detector stage determined in (i).

20 Claims, 1 Drawing Sheet

Figure 1:
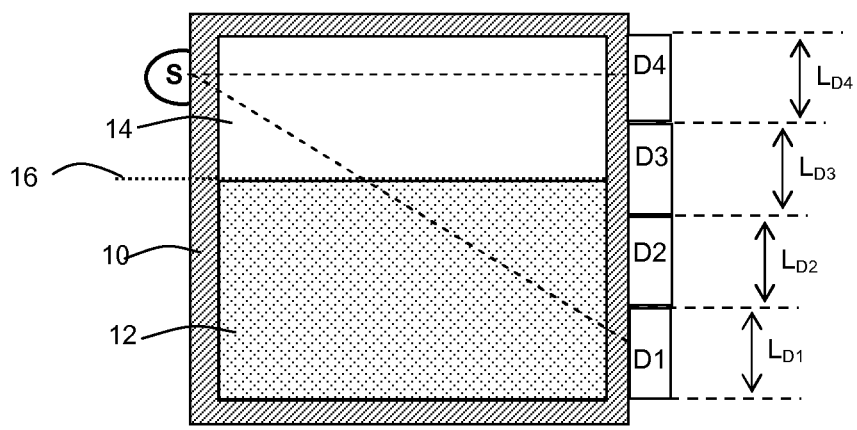

(58) Field of Classification Search
USPC .......... 702/55, 50; 378/59, 52, 89; 250/564, 250/357.1
See application file for complete search history.

(56) References Cited

U.S. PATENT DOCUMENTS

| | | | |
|---|---|---|---|
| 3,594,575 A | 7/1971 | Shoemaker | |
| 3,654,458 A | 4/1972 | Burrus et al. | |
| 4,591,719 A | 5/1986 | Bonnemay | |
| 5,099,124 A | 3/1992 | Benson | |
| 6,104,033 A | 8/2000 | Graeme | |
| 6,548,814 B1* | 4/2003 | Gronli | G01N 23/04 250/357.1 |
| 8,324,572 B2* | 12/2012 | Nistor | G01S 11/125 250/308 |
| 2004/0025569 A1 | 2/2004 | Damn et al. | |
| 2015/0338262 A1* | 11/2015 | Glaser | G01N 9/24 378/52 |

OTHER PUBLICATIONS

GB Search Report, dated Oct. 31, 2011, from corresponding GB application.

\* cited by examiner

LEVEL MEASUREMENT METHOD AND APPARATUS

BACKGROUND OF THE INVENTION

Field of the Invention

The present invention concerns a method for the measurement of a level of contents within a container or vessel and an apparatus which is adapted to be useful in carrying out the inventive method. In particular the method is a method of measuring a level, especially of a fluid, within a container by measurement of radiation emitted by a source of radiation and detected by a radiation detector after it has passed through a portion of the container in which the contents may be present.

Description of the Related Art

The measurement of a level in a container by means of radiation has been well known and widely applied for many years. For example U.S. Pat. No. 3,654,458 describes the detection and control of a liquid level in a sub-sea vessel using a source of ionising radiation and a plurality of detectors.

There is a need for improved level measurement systems which provide advantages over the apparatus and methods of the prior art.

SUMMARY OF THE INVENTION

According to the invention we provide a method of determining the location within a measurement range of a boundary between two phases within a vessel, each phase having different radiation attenuation characteristics, comprising the steps of:
(a) providing at least one source of radiation capable of emitting radiation through a portion of the interior of the vessel
(b) providing a plurality of radiation detectors, each detector being capable of detecting, within a part of said measurement range, radiation emitted by the source,
(c) providing a data processing means for calculation of the position of the phase boundary from the amount of radiation detected by the detectors;
characterised in that the data processing means calculates the position of the phase boundary from the amount of radiation detected by the detectors by
(i) determining within which detector stage the phase boundary is located and then
(ii) determining the position of the phase boundary within the detector stage determined in (i)

The method accurately determines phase boundary position when deposits build up on the vessel walls, when the pressure changes or when foam develops in the vapour space above a liquid. The method also offers improved accuracy over conventional level or interface measurement systems of the prior art even when no foam or deposits are present.

According to a further aspect of the invention we provide an apparatus for measuring the position within a measurement range of a boundary between two phases within a vessel, each phase having different radiation attenuation characteristics, comprising the steps of:
(a) providing at least one source of radiation capable of emitting radiation through a portion of the interior of the vessel
(b) providing a plurality of radiation detectors, each detector being capable of detecting, within a part of said measurement range, radiation emitted by the source,
(c) providing a data processing means for calculation of the position of the phase boundary from the amount of radiation detected by the detectors;
characterised in that the data processing means calculates the position of the phase boundary from the amount of radiation detected by the detectors by
(i) determining within which detector stage the phase boundary is located
and then
(ii) determining the position of the phase boundary within the detector stage determined in (i).

The radiation-attenuation characteristics of the phases present in the vessel between which the boundary is desired to be located are different. This means that the radiation from the source transmitted to a detector through one of the phases is less than the radiation from the source transmitted to a detector the same distance through the other one of the phases. In this way the amount of material of each phase between the source and the (or each) detector affects the transmission of radiation through the bulk material. A comparison of the detected transmitted radiation therefore allows changes in the density of the medium to be measured so that the phase boundary may be located.

In a conventional level measurement system of the prior art, a radiation source is arranged to emit radiation through the interior of a vessel towards one or more detectors arranged along a path forming the measurement range of the level measurement system. When, for example, the vessel contains a liquid and a headspace gas, one or more of the detectors may be below the level of the liquid and one or more detectors may be located above the level of the liquid, i.e. within the headspace. In many prior art systems, a single, elongate detector in the form of a length of scintillating material is used, such that part of the scintillator is above the liquid level and part below. Radiation is attenuated by the medium through which it travels so that less than 100% of the radiation emitted by the source is detected by the detectors. The amount of radiation emitted by the source which is detected by a detector after transmission through a medium is proportional to the density and the amount of the medium through which it has traveled. The level of a liquid within a vessel, for example, is therefore conventionally measured by determining the total amount of radiation emitted by the source and detected by the detectors and identifying a change in the total detected radiation as the level of liquid changes. A relatively low liquid level provides overall a less dense medium for transmission of radiation and therefore relatively more radiation is detected than when the liquid level is higher. In conventional level measurement instruments of the prior art, the total integrated count rate from the complete detector system is used to calculate level. Any reduction in count rate, caused for example by the deposition of solids on the vessel walls, pressure changes or the development of foam in the vapour space, will lead to an erroneously high level measurement. One advantage of the method and apparatus described herein is that it allows accurate level measurement despite the build-up of deposits or the development of foam in the vapour space. A second advantage of the invention is that it allows improved measurement accuracy even when no foam or deposits are present. This second advantage arises because measurement errors caused by the effect of natural, statistically predictable fluctuations in count rate are reduced when compared with those produced by conventional prior art systems.

The measurement range is the extent of the vessel within which the phase boundary can be detected by the method and apparatus. The apparatus is normally designed to have a measurement range covering the expected variation in the location of the phase boundary. Often this covers most or all of the practical height of the vessel although in some applications the measurement range may be designed to be smaller when the phase boundary of fill of the vessel is not expected to vary by much. The part of the measurement range over which each detector is capable of detecting radiation will be referred to as the detector stage. Taken together, the detector stages cover the entire measurement range. The detector stages of adjacent detectors are preferably arranged to be contiguous. The measurement range normally extends along a part of the vessel covering the height over which the level is expected to vary. The detectors may be immersed in the vessel contents directly but are preferably located outside the vessel or within a protective housing, chamber or dip-tube positioned within the vessel. When the detectors are located outside the vessel, they are usually adjacent to or mounted on the vessel wall. The detectors are oriented so that they detect radiation from the source. The detectors may be shielded from radiation arriving from a direction other than the direction of the source.

The method and apparatus of the invention is particularly suitable for determining the location in a vessel of a phase boundary between two fluid phases although its application to vessels containing solid phases is not excluded. A widespread application for such apparatus is the determination of a liquid level in a vessel containing a liquid and a gas phase (which may be e.g. air, a vacuum or a headspace vapour). The phase boundary determined by the method of the invention is then the liquid level. The vessel may alternatively contain more than one liquid phase, e.g. an aqueous and an organic phase, such as oil and water.

In a preferred form the radiation comprises ionising radiation such as X-rays or, more preferably, gamma rays. Alternatively microwaves, radio waves, or sound waves may be used. The radiation used is selected by the transparency to the radiation of the vessel and/or its contents (i.e. the attenuation coefficient of the medium) and the availability of suitable sources and detectors. Radiation from the visible or near-visible spectrum may be used but its use would be very limited. For scanning large solid structures such as process vessels, gamma radiation is greatly preferred. Suitable sources of gamma include $^{60}$Co and $^{137}$Cs, $^{133}$Ba, $^{241}$Am, $^{24}$Na and $^{182}$Ta, however any gamma-emitting isotope of sufficient penetrating power could be used, and many such are already routinely used in level measurement devices. For a permanent installation, a radioisotope source should be chosen to have a relatively long half life to give the equipment a satisfactory service life. Usually, the half-life of the radioisotope used will be at least 2, and desirably at least 10, years. The half-lives of the radioisotopes mentioned above are: $^{137}$Cs gamma ca. 30 years, $^{133}$Ba ca. 10 years and $^{241}$Am ca. 430 years. Suitable sources generally emit radiation at energies between about 40 and 1500 keV and suitable detectors can detect such radiation with sufficient sensitivity that the radiation detected varies according to the density of the transmission medium.

One or more than one sources may be used in the level measurement method and apparatus. Normally the number of sources used is not more than 10 and is preferably from 1-4. Each source may emit a beam of radiation towards more than one detector, generally from 4-10 detectors, but from 2-40 detectors may be used, depending on the size/detection area of each detector and the resolution required of the apparatus.

The particular detectors used in the apparatus and method are not in themselves critical although in practice compact devices will usually be chosen. The detectors may be electrically powered e.g. Geiger-Muller (GM) tubes or scintillation detectors linked with photo-detectors such as photomultipliers or photodiodes, or un-powered as in simple scintillation devices. Among electrically powered detectors, GM tubes are preferred, because they are electrically and thermally robust and are available in mechanically robust forms. Among un-powered detectors scintillation detectors linked to counters by fibre optic links (optionally with a light detector such as a photomultiplier or photodiode outside the container for the medium under test) are particularly useful. When electrically powered detectors are used and especially when the apparatus is used in a combustion or explosion risk environment, it is desirable that the total electrical energy and power associated with the detectors is sufficiently low as not to be a significant source of ignition in the event of system failure (particularly resulting in direct contact between combustible or explosive materials and any electrically live components).

The counting devices for any of these detectors will usually be electronic and each detector will be associated with a counter which will usually be linked to the data processor. It will usually be practical to provide a counter for each detector, but time division multiplexing of counters can be used although with a resultant increase in the time needed for calculation and consequently an increase in the minimum time interval between measurements.

The data processor may be any commercial processor which is capable of operating on the data from the counters to produce the required information. The processor may comprise a standard computer or may be a dedicated device which is installed as a part of the boundary location system. The processor is linked to the counters so that the count data may be passed to the processor. The link may be wired or wireless, depending on the circumstances and requirements of the system. The processor is capable of interrogating the counters at pre-determined intervals of time and for a pre-determined duration and therefore includes a timing device. The processor calculates the count-rate produced by each detector and smoothes the count-rate values according to a time constant Tc or another filtering algorithm. Tc is a calibration parameter that is often used in nucleonic applications. Suitable smoothing algorithms are well-known in the art of instrument design. If a steady count-rate should suddenly change by $\Delta Q$ then, after time t has elapsed, the measured change in count-rate will be $$\Delta Q(t) = \Delta Q \left(1 - e^{-\frac{t}{T_c}}\right).$$

For a fixed radiation intensity, a detector will produce a smoothed count-rate Q that fluctuates by an amount $$\frac{Q}{\sqrt{2QT_c}}$$

(+/− one standard deviation).

The processor may also correct the smoothed count-rate values for the effects of source decay according to the half-life of the isotope used in the application.

The processor is also linked to an interface such as a display, a control system or an alarm by which information concerning the phase boundary location may be used to control the vessel process parameters if required. Suitable data processing apparatus are widely available and already known and used in conventional level measurement systems. The skilled person may readily select an appropriate device. The selection of the data processing apparatus does not form a part of the present invention although the operation of the apparatus does.

The data processing means is adapted to calculate the position of the phase boundary from the amount of radiation detected by the detectors in a two-step method, in which, in a first step, it is determined in which detector stage the phase boundary is located, and then, in a second step, the position of the phase boundary within the relevant detector stage is calculated.

The first step is preferably done by comparing the count-rate from each detector at the time of measurement with the count-rate detected by the same detector when it is just-covered, i.e. when the detector stage is just full of the more dense phase and when it is uncovered, i.e. when the detector stage is empty of the more dense phase and/or full of the less-dense phase. If the count-rate from a particular detector stage is significantly greater than the count-rate measured when the same detector is just-covered, then that detector stage is very likely to contain some of the less-dense phase and a phase boundary is likely to be present in that detector stage. In such a case, all detector stages above that detector stage should also contain one or more less-dense phases. Therefore it is preferred to confirm the detector stage containing the phase boundary by comparing the count-rate from the adjacent higher detector stage with its own just-covered count-rate. In a particularly preferred method, the detector stage in which the phase boundary is located is determined by the data processor carrying out the following method:

a) for each detector n, where n varies from 1 to N and N is the number of detectors, acquire the current smoothed and decay-corrected count-rate $Q_n$
b) Calculate:

$$Q_{nf} + \frac{XQ_n}{\sqrt{2Q_n T_c}}$$

for all n stages
where $Q_{nf}$ is the count-rate when the dense phase is just covering the nth stage, and $T_c$ is the time constant. X is a number ranging from 0 to 5 that is chosen depending on the accuracy and response time of the system. X is preferably 0, but may be larger than zero in applications where system stability is critical.
c) Starting with lowest stage (n=1), establish whether:

$$Q_n \geq Q_{nf} + \frac{XQ_n}{\sqrt{2Q_n T_c}} \quad \text{(Algorithm A)}$$

d) If algorithm A is not satisfied, increment for n until the lowest stage p is reached where algorithm A is satisfied i.e.:

$$Q_p \geq Q_{pf} + \frac{XQ_p}{\sqrt{2Q_p T_c}}$$

Stage p is the lowest stage in the detector for which algorithm A is satisfied. We say that the phase boundary is contained in detector stage p. If algorithm A is not satisfied for all n from 1 to N−1 and the relationship $$Q_N \geq Q_{Nf} + \frac{XQ_N}{\sqrt{2Q_N T_c}}$$

is also not satisfied, then the phase boundary is assumed to be above detector stage N.

In an alternative method, which provides additional robustness, the following procedure can be followed:
a) for each detector n, where n varies from 1 to N and N is the number of detectors, acquire the current smoothed and decay-corrected count rate $Q_n$
b) Calculate:

$$Q_{nf} + \frac{XQ_n}{\sqrt{2Q_n T_c}}$$

for all n stages
where $Q_{nf}$, Tc, X are as given above.
c) Starting with lowest stage (n=1), establish whether:

$$Q_n \geq Q_{nf} + \frac{XQ_n}{\sqrt{2Q_n T_c}} \quad \text{(Algorithm B)}$$

and $$Q_{(n+1)} \geq Q_{(n+1)f} + \frac{XQ_{(n+1)}}{\sqrt{2Q_{(n+1)} T_c}}$$

d) If algorithm B is not satisfied, increment for n until the lowest stage p is reached where algorithm B is satisfied i.e.:

$$Q_p \geq Q_{pf} + \frac{XQ_p}{\sqrt{2Q_p T_c}}$$

and $$Q_{(p+1)} \geq Q_{(p+1)f} + \frac{XQ_{(p+1)}}{\sqrt{2Q_{(p+1)} T_c}}$$

Stage p is the lowest stage in the detector for which algorithm B is satisfied. We say that the phase boundary is contained in detector stage p. If algorithm B is not satisfied for all n from 1 to N−1 and the relationship $$Q_N \geq Q_{Nf} + \frac{XQ_N}{\sqrt{2Q_N T_c}}$$

is also not satisfied, then the phase boundary is assumed to be above detector stage N.

It is preferred that the detectors are arranged so that stage N is at the top of the vessel and that the highest phase boundary position falls within detector stage N. Using this preferred arrangement, algorithm B is incremented for n until n=(N-1). If algorithm B has not been satisfied then the count-rates from stages (N-1) and N are examined. If the vessel is full then algorithm B is not satisfied so the phase boundary position is above stage (N-1). The data processor is programmed to assume that the liquid level is in stage N when n is incremented from (N-1) to N. If the vessel is full, the second step, described below, will confirm that the level=100%.

In the second step, the position of the phase boundary within the detector stage found to contain the phase boundary is calculated. This is preferably done by calculating the ratio of count rate detected by the detector to the count rate when the detector stage is just covered. In a preferred method, the position of the phase boundary within the detector stage p found to contain the phase boundary is determined by the data processor by solving Algorithm C.

$$h = \left(\frac{Q_{pe} - Q_p}{Q_{pe} - Q_{pf}}\right) * \text{length of detector stage } p \quad \text{(Algorithm C)}$$

where:
h is the height of the phase boundary above the bottom of detector stage p,
$Q_{pe}$ is the count-rate when the dense phase is below detector stage p.
$Q_p$ is the current smoothed and decay-corrected count-rate in detector stage p.
$Q_{pf}$ is the count-rate when the dense phase is just covering detector stage p.

In order to determine the level within the measurement range of the phase boundary, the length of the measurement range below detector stage p is added to the result of Algorithm C to give a total height of the phase boundary above the bottom of the measurement range. When all of the detector stages are the same length and the detectors are arranged linearly:

$$\text{The level of the phase boundary} = \text{stage length}\left[(p-1) + \left(\frac{Q_{pe} - Q_p}{Q_{pe} - Q_{pf}}\right)\right]$$

and $$\% \text{ level} = \frac{100}{N}\left[(p-1) + \left(\frac{Q_{pe} - Q_p}{Q_{pe} - Q_{pf}}\right)\right]$$

where N=total number of detector stages.

Figure 2:
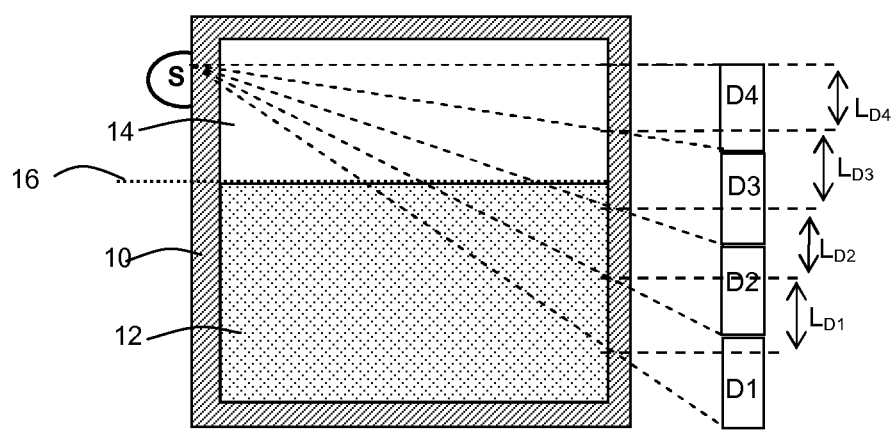

When detector stages are not the same length, or not arranged linearly, for example on a drum vessel, then the equations need to be modified appropriately. Additional modifications to these equations are necessary if the detector is not situated directly in contact with the vessel wall, as shown in FIG. 2. In this case, due to geometric considerations of the radiation paths, the level in the vessel is slightly different to the level on the detector. All of these modifications are simple changes and would be clear to somebody skilled in these matters.

In order to further improve accuracy, an alternative method for determining the position of the phase boundary within a stage is to calibrate the count rate as a function of level within each stage. This can be done either experimentally, or by modelling.

$Q_{ne}$, $Q_{nf}$ are obtained in a calibration step. $Q_{ne}$ is measured for each detector n when the vessel is empty or contains only the less dense phase. $Q_{nf}$ is measured for each detector stage when the vessel has been filled with the dense phase to a level where the dense phase just covers the detector, or just fills the detector stage. Alternatively, $Q_{ne}$, $Q_{nf}$ may be obtained by calculation using an appropriate model from the path length between the source and the detector, the energy of the source radiation, the density of the dense and less dense phases and the mass absorption coefficient of the material. When the instrument is calibrated, the count rates over a prolonged period, should be measured to provide time-averaged count rates to determine $Q_{ne}$ and $Q_{nf}$ which are as representative a figure as possible.

In some applications, the nature of the contents of the vessel causes deposition of solid or thick liquid material on the walls of the vessel leading to a reduction in the radiation detected by the detectors opposite the deposits. Ideally the deposits are cleared away from the vessel walls but it is often necessary to operate a level detector in the presence of these deposits, the thickness of which may be unknown. Accordingly, a preferred method further comprises a third step in which the effect of the deposition of a dense phase, such as solids or a thick liquid, on the wall of the vessel may be accounted for in the calculation of the position of the phase boundary. The third step comprises resetting the empty counts calibration $Q_{ne}$ to the currently measured counts $Q_n$ for all detector stages above stage p, the level of the calculated detector stage containing the phase boundary. The difference between $Q_n$, measured during normal operation of the method, and the initial value $Q_{ne}$, measured when the vessel was empty, may also be used to calculate an approximate density of deposits that are present on the vessel wall. When the nature of the deposits is known, the thickness of these deposits may be approximately calculated. When the reduction in radiation above the phase boundary has reached a value which is likely to affect the measurement method, the vessel may be cleared of deposits. This third step may be useful when the deposits that build up on the vessel wall have a density when wet which is greater than the density of the more dense of the phases forming the phase boundary.

BRIEF DESCRIPTION OF THE DRAWING FIGURES

The invention is further described in the accompanying drawings which are:—

FIG. 1: a section through a vessel incorporating a level measurement system according to the invention; and FIG. 2: a section through a vessel incorporating an alternative embodiment of a level measurement system according to the invention.

DETAILED DESCRIPTION OF THE INVENTION

In the level measurement system shown schematically in FIG. 1, a radiation source "S" is arranged to emit radiation through the interior of a vessel 10 towards 4×200 mm long Geiger tubes D1, D2, D3, & D4 arranged linearly to produce a detector 800 mm long arranged approximately vertically down an opposed wall of the vessel. The vessel contains a liquid 12 and a gas 14. D1 and D2 are below the level of the liquid and D4 is above the level of the liquid. The system has been calibrated so that the count rate on each detector Dn when above the level of the liquid $Q_{ne}$ and when just covered by the liquid $Q_{nf}$ are known.

For detectors D1 and D2, $$Q_1 \geq Q_{1f} + \frac{XQ_1}{\sqrt{2Q_1 T_c}}$$

and $$Q_2 \geq Q_{2f} + \frac{XQ_2}{\sqrt{2Q_2 T_c}}$$

are not satisfied.

Therefore the phase boundary between liquid 12 and gas 14, i.e. the level 16 of the liquid 12, is calculated to be above D2. The lowest detector stage for which algorithm B is satisfied is D3. Therefore the level of liquid 12 is determined to be within detector stage 3.

$$\text{The level of liquid 12 therefore} = L_{D1} + L_{D2} + \left[ L_{D3} \left( \frac{Q_{3e} - Q_3}{Q_{3e} - Q_{3f}} \right) \right]$$

where $L_{Dn}$=length of detector stage n.

When the method described above is utilised to determine the position of the phase boundary, the measurement is unaffected by the build-up of solid deposits on the vessel walls or by the presence of foam above a liquid level. Even when no deposits and no foam are present, the method provides enhanced accuracy over conventional instruments of the prior art. For example, assume that there are N detector stages each with length $L_D$. For simplicity, assume that each stage produces a count-rate $Q_{ne}$ when uncovered and zero count-rate when covered by the liquid.

According to the method described herein, it is determined that the level is contained within a particular stage and the position of the phase boundary within the detector stage is then calculated. The maximum stage count-rate is $Q_{ne}$ (corresponding to minimum level in the stage) and the minimum stage count-rate is zero (corresponding to maximum level in the stage). So, the stage count-rate changes by $Q_{ne}$ as the level changes by $L_D$.

The uncertainty in the maximum stage count-rate is $$\pm \frac{Q_{ne}}{\sqrt{2Q_{ne} T_c}}$$

(one standard deviation).

Since the stage count-rate changes by $Q_{ne}$ as the level changes by $L_D$, an uncertainty in count-rate of $$\pm \frac{Q_{ne}}{\sqrt{2Q_{ne} T_c}}$$

leads to a maximum uncertainty in phase boundary position of $$\pm \frac{Q_{ne}}{\sqrt{2Q_{ne} T_c}} \frac{L_D}{Q_{ne}} \quad (1)$$

$$\text{ie} \pm \frac{L_D}{\sqrt{2Q_{ne} T_c}}$$

Note that this is the maximum error when the level is in any stage.

For comparison, in prior art systems the total integrated count-rate from the complete detector system is used to calculate level. In such a prior art case, when the level is close to the bottom of the measurement range the total detector count-rate is $NQ_{ne}$ and the uncertainty associated with this count-rate is $$\pm \frac{NQ_{ne}}{\sqrt{2NQ_{ne} T_c}}.$$

The total count-rate changes by $NQ_{ne}$ as the level changes by $NL_D$ (ie over the measurement range). So, an uncertainty in total count-rate of $$\pm \frac{NQ_{ne}}{\sqrt{2NQ_{ne} T_c}}$$

leads to an uncertainty in $$\text{level measurement} = \pm \frac{NQ_{ne}}{\sqrt{2NQ_{ne} T_c}} \frac{NL_D}{NQ_{ne}}$$

$$\text{ie} \pm \frac{L_D \sqrt{N}}{\sqrt{2Q_{ne} T_c}} \quad (2)$$

A comparison of (1) and (2) indicates that for low levels, level measurement according to the invention is more accurate (by a factor $\sqrt{N}$) than measurements provided by prior art systems that utilise the total integrated count-rate from the entire detector system. The improvement in accuracy becomes smaller as the level rises, but for all levels up to the top of the range, measurements made according to the method of the invention are more accurate than measurements provided by said prior art systems.

The invention claimed is:

1. A method of determining a location, within a measurement range of a phase boundary between a first material phase and a second material phase within a vessel,
the first and second material phases having different radiation attenuation characteristics, and the first material phase being denser than the second material phase,
the method comprising the steps of:
a) emitting radiation from at least one source of radiation through a portion of an interior of the vessel,
b) detecting the radiation using a plurality of radiation detectors,
each radiation detector being capable of detecting an amount of the radiation within a corresponding detector stage of the measurement range, the corresponding detector stage being associated with the radiation detector and the corresponding detector stage having a top and a bottom and over which corresponding detector stage the said radiation detector is capable of detecting the radiation emitted by the source, c) calculating the location of the phase boundary from the amount of radiation detected by each of the plurality of radiation detectors by
(i) in a first step, determining, with a data processing processor, within which detector stage the phase boundary is located by comparing the amount of radiation received by each of the plurality of radiation detectors with:
  (a) an amount of radiation detected by the each of the plurality of radiation detectors when the phase boundary is located at the top of the corresponding detector stage; or
  (b) an amount of radiation detected by the each of the plurality of radiation detectors when the phase boundary is located at or below the bottom of the corresponding detector stage; or
  (c) both (a) and (b),
and then
(ii) in a second step, determining, with a data processing processor, the location of the phase boundary within the detector stage determined in (i).

2. The method according to claim 1, wherein the first material phase comprises a liquid phase and the second material phase comprises a gas phase.

3. The method according to claim 1, wherein the first material phase and the second material phase comprise two liquids having different densities.

4. The method according to claim 1, wherein in step (i), a smoothed count rate produced by each of the plurality of radiation detectors is compared with:
  (a) a count-rate produced by each of the plurality of radiation detectors when the phase boundary is located at the top of the corresponding detector stage; or
  (b) a count-rate produced by the each of the plurality of radiation detectors when the phase boundary is located at or below the bottom of the corresponding detector stage; or
  (c) both (a) and (b).

5. The method according to claim 4, wherein, in step (i), said comparison is made in two adjacent detector stages.

6. The method according to claim 5, wherein step (i) is carried out using a method comprising the steps of:
  a) for each radiation detector n, where n varies from 1 to N and N is the number of radiation detectors, acquire a current smoothed and decay-corrected count-rate $Q_n$
  b) calculate:

$$Q_{nf} + \frac{XQ_n}{\sqrt{2Q_n T_c}}$$

for all N radiation detectors,
where $Q_{nf}$ is a smoothed count rate when the phase boundary is just at the top of the detector stage corresponding to radiation detector n, Tc is a time constant and X is a number ranging from 0 to 5,
  c) starting with a lowest radiation detector (n=1), establish whether:

$$Q_n \geq Q_{nf} + \frac{XQ_n}{\sqrt{2Q_n T_c}} \quad \text{(Algorithm A)}$$

d) if algorithm A is not satisfied, increment for n until a lowest radiation detector p is reached where algorithm A is satisfied such that:

$$Q_p \geq Q_{pf} + \frac{XQ_p}{\sqrt{2Q_p T_c}}$$

e) determine that the phase boundary is located in the detector stage corresponding to radiation detector p.

7. The method according to claim 6 where X=0.

8. The method according to claim 5, wherein step (i) is carried out using a method comprising the steps of:
  a) for each radiation detector n, where n varies from 1 to N and N is the number of radiation detectors, acquire a current smoothed and decay-corrected count-rate $Q_n$
  b) calculate:

$$Q_{nf} + \frac{XQ_n}{\sqrt{2Q_n T_c}}$$

for all N radiation detectors,
where $Q_{nf}$ is a smoothed count rate when the phase boundary is at the top of the detector stage corresponding to radiation detector, Tc is a time constant and X is a number ranging from 0 to 5,
  c) starting with a lowest radiation detector (n=1), establish whether:

$$Q_n \geq Q_{nf} + \frac{XQ_n}{\sqrt{2Q_n T_c}} \quad \text{Algorithm B)}$$

and $$Q_{(n+1)} \geq Q_{(n+1)f} + \frac{XQ_{(n+1)}}{\sqrt{2Q_{(n+1)} T_c}}$$

d) If algorithm B is not satisfied, increment for n until a lowest radiation detector p is reached where algorithm B is satisfied such that:

$$Q_p \geq Q_{pf} + \frac{XQ_p}{\sqrt{2Q_p T_c}}$$

and $$Q_{(p+1)} \geq Q_{(p+1)f} + \frac{XQ_{(p+1)}}{\sqrt{2Q_{(p+1)} T_c}}$$

e) determine that the phase boundary is located in the detector stage corresponding to radiation detector p.

9. The method according to claim 8 where X=0.

10. The method according to claim 1, wherein step (ii) is carried out by a method comprising comparing a count-rate detected by the radiation detector corresponding to a detector stage determined in step (i), with
  (a) a count-rate produced by the radiation detector when the phase boundary is located at the top of the detector stage determined in step (i); or
  (b) a count-rate produced by the radiation detector when the phase boundary is located at or below the bottom of the detector stage determined in step (i); or
  (c) both (a) and (b).

11. The method according to claim 10, wherein the location of the phase boundary within the detector stage p determined in step (i) to contain the phase boundary is determined by solving Algorithm C:

$$h = \left(\frac{Q_{pe} - Q_p}{Q_{pe} - Q_{pf}}\right) * \text{length of detector stage } p \qquad \text{(Algorithm C)}$$

where:

h=height of the phase boundary above the bottom of detector stage p, $Q_{pe}$ is a count-rate detected by the radiation detector corresponding to detector stage p when the phase boundary is below the bottom of detector stage p, $Q_p$ is a current smoothed and decay-corrected count-rate detected by the radiation detector corresponding to detector stage p, $Q_{pf}$ is a count-rate detected by the radiation detector corresponding to detector stage p when the phase boundary is at the top of detector stage p.

12. The method according to claim 10, wherein the location of the phase boundary within the measurement range is a sum of a location of the phase boundary within the detector stage determined in step (i) and a length of the measurement range below the detector stage determined in step (i).

13. The method according to claim 1, further comprising obtaining values for $Q_{ne}$ and $Q_{nf}$, wherein $Q_{ne}$ represents for each radiation detector n a count rate when the vessel contains only the second material phase, and $Q_{nf}$ represents for each radiation detector n a count rate when the phase boundary is at the top of the detector stage corresponding to radiation detector n.

14. The method according to claim 13, wherein Qne and $Q_{nf}$ are measured in a calibration step in which $Q_{ne}$ is measured for each radiation detector n when the phase boundary is at the top of the detector stage corresponding to radiation detector n.

15. The method according to claim 13, wherein $Q_{ne}$ and $Q_{nf}$ are obtained by calculation.

16. The method according to claim 1, further comprising a third step in which an effect on a count-rate detected by at least one of the radiation detectors of either a) the deposition of a dense phase on a wall of the vessel or b) a change in density of at least one of the first or the second material phase, or c) a presence of a foam within the vessel is applied to the calculations in step (i), or step (ii) or steps (i) and (ii).

17. The method according to claim 16, wherein said third step comprises resetting a calibration count-rate $Q_{ne}$ to a currently measured count-rate $Q_n$ for all of the radiation detectors corresponding to detector stages above the detector stage determined to contain the phase boundary.

18. The method according claim 1, wherein the difference between a count rate Qn, detected by at least one of the radiation detectors, and an initial value $Q_{ne}$, detected by the at least one of the radiation detectors when the vessel contained only the second material phase is used to calculate a characteristic of deposits that are present on a wall of the vessel.

19. An apparatus for measuring a location within a measurement range of a phase boundary between two material phases within a vessel, each material phase having different radiation attenuation characteristics, comprising:
  at least one source of radiation arranged to emit radiation through a portion of an interior of the vessel,
  a plurality of radiation detectors, each radiation detector being arranged to detect, within a corresponding detector stage associated with the radiation detector and the corresponding detector stage having a top and a bottom and over which corresponding detector stage the radiation detector is capable of detecting the radiation emitted by the source of radiation,
  a data processor for calculation of the location of the phase boundary from an amount of radiation detected by the radiation detectors;
  wherein the data processing processor is programmed to calculate the location of the phase boundary from an amount of radiation detected by the radiation detectors by
  (i) in a first step, determining within which detector stage the phase boundary is located, wherein the determining comprises comparing the amount of radiation received by each of the plurality of radiation detectors with:
    (a) an amount of radiation detected by the each of the plurality of radiation detectors when the phase boundary is located at the top of the corresponding detector stage; or
    (b) an amount of radiation detected by the each of the plurality of radiation detectors when the phase boundary is located at or below the bottom of the corresponding detector stage; or
    (c) both (a) and (b),
  and then
  (ii) in a second step, determining the location of the phase boundary within the detector stage determined in step (i).

20. The apparatus according to claim 19, wherein the data processor is programmed to carry out a calculation to locate said phase boundary.

* * * * *